Jan. 18, 1966  P. H. KECK ETAL  3,230,474
SOLID STATE LASER AND PUMPING MEANS THEREFOR USING
A LIGHT CONDENSING SYSTEM
Filed Feb. 16, 1962
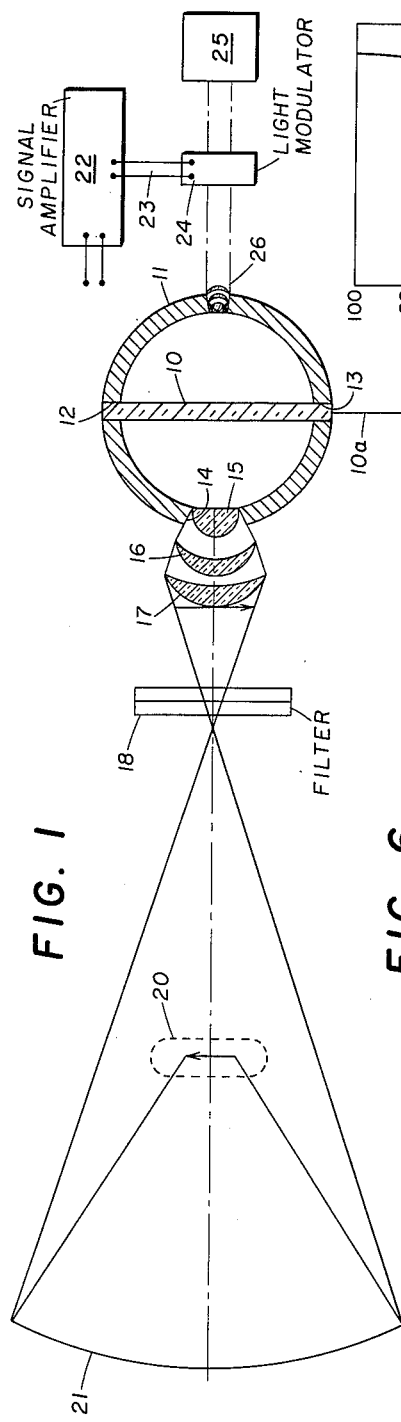
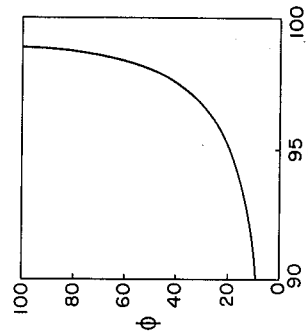
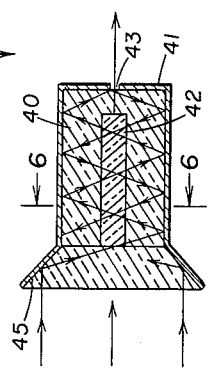
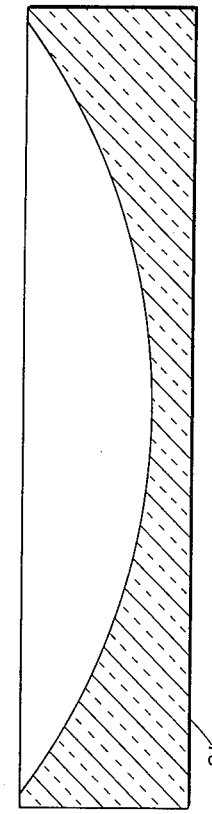
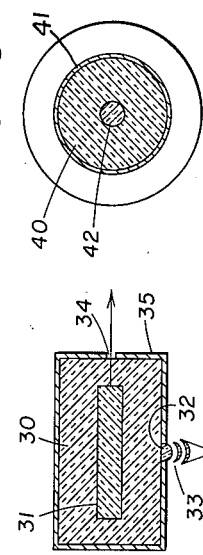
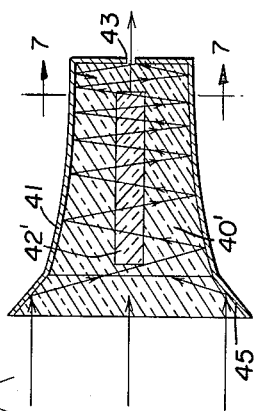
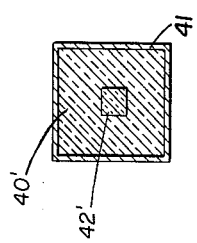

United States Patent Office 3,230,474
Patented Jan. 18, 1966

3,230,474
SOLID STATE LASER AND PUMPING MEANS THEREFOR USING A LIGHT CONDENSING SYSTEM
Paul H. Keck, P.O. Box 5474, Dallas 22, Tex., and Max J. Keck, 400 N. River Road, West Lafayette, Ind.
Filed Feb. 16, 1962, Ser. No. 174,660
7 Claims. (Cl. 331—94.5)

This invention relates to lasers and more particularly to the concentration and control of the pumping light for a solid state laser.

Solid optical masers or lasers include a rod of active material whose ends are polished plane and parallel and coated to reflect light with one end partially transmissive to provide for output therefrom. The sides of the rod are left clear to admit pumping light. Generally, the pumping light from a powerful source enters through the sidewalls to excite atoms in the solid rod. Light of an appropriate wavelength longer than that of the pumping light then is stimulated, causing the excited atoms to emit. Light of the output wavelength traveling along the axis of the rod is amplified by the stimulated emission. By reason of reflection from the ends of the rod, light flux continues to build up within the rod and a coherent wave is established. Some of the light in the coherent wave escapes through the partially transmissive end surface to produce a very intense collimated beam of light of very narrow band width or wavelength spread. The outstanding characteristic of the solid state laser is that the output light is nearly monochomatic.

In order to produce laser operation, it is necessary that pumping light incident to the rod be of intensity at least above a threshold. The threshold is dependent upon the particular rod. Amplification in the rod by stimulated emission must be sufficient to make up for the transmission losses. This means that excited atoms must be supplied at a given intensity. It can be shown that the number (N) of excited atoms which must be supplied per second is:

$$N = \frac{8\pi^2}{(\pi \ln 2)^{1/2}} \frac{1}{\phi t} \cdot \frac{V}{\lambda^3} \cdot \frac{\Delta\nu}{\nu} \qquad (1)$$

where $\phi$=fraction of atoms which decay by any way other than in the desired transition
$t$=lifetime of light in the resonator
$V$=volume of the resonator
$\lambda$=wavelength of the emitted light in the material
$\nu$=freqency of the emitted light
$\Delta\nu$=width of the line emitted in spontaneous emission.

From the foregoing equation it will be noted taht the number of excited atoms required is proportional to the volume of the rod. Also, since the lifetime of light in the rod is proportional to the length of the rod, the pumping power must be proportional to the cross sectional area. In prior art devices the rod has been positioned as to receive light from a high intensity source. Typically, the rod is positioned within a helically shaped flash lamp. Such prior art devices have been adequate for intermittent operation. The object of more recent investigations has been to operate a laser continuously.

It is, therefore, an object of the present invention to provide for the concentration and control of pumping light from a high intensity source and for applying such light to a laser rod. It is a further object of the present invention to provide pumping light of such level and character as to permit continuous laser operation.

A further object is to provide a laser system capable of excitation at a relatively low level and to provide for laser modulation.

More particularly, in accordance with the present invention there is provided a laser system including a laser rod which is positioned within a chamber having an opening of limited area aligned with the axis of the laser rod. The walls of the chamber are highly reflective as to retain any of the light therein which is injected. There is then provided a light source for producing high level light flux in the chamber whereupon multiple reflections in the chamber amplify the effective pumping light flux for absorption by the rod to produce stimulated emission therein.

In a further aspect of the invention there is provided a method of exciting a laser. Light flux is established which includes energy in an absorption band of the laser. The light flux is injected into the region of the laser and directed towards the laser by reflection from points which are distributed in an array encompassing the laser to confine the flux in the region of the laser for absorption therein. In a preferred embodiment light is reflected from a substantially solid or continuous array of points encompassing the laser to produce substantially total reflection of injected light flux from the source.

In a more specific aspect of the invention there is provided a laser rod in a sphere with one end of the rod aligned with an output opening in the sphere of dimensions corresponding with those of the rode. The inner walls of the sphere are highly reflective to retain any light introduced therein. A light source is then provided with a light-condensing system disposed between the source and the chamber. The light is then introduced into the chamber by means of the condensing system through an input wall opening. Preferably, the input and output openings to the chamber are very small compared with the total volume of the chamber and the ratio of the volume of the chamber to the volume of the rod is maintained at a minimum value.

For a more complete understanding of the present invention and for further objects and advantages thereof, reference may now be had to the following description taken in conjunction with the accompanying drawings in which:

FIGURE 1 is a schematic representation of a solid state laser;
FIGURE 2 illustrates a mirror used in FIGURE 1;
FIGURE 3 is a graph illustrating the amplification of pumping light through use of a spherical chamber;
FIGURE 4 illustrates a modification of the invention;
FIGURE 5 illustrates a further modification in which a large injection opening is provided;
FIGURE 6 is a sectional view taken along line 6—6 of FIGURE 5;
FIGURE 7 is an embodiment of the system of FIGURE 6 having rectangular cross section; and
FIGURE 8 is a modification of the system of FIGURE 6.

Referring now to FIGURE 1, a laser rod 10 is of material suitable for stimulated emission by optical pumping. In this embodiment of the invention the rod 10 is formed of neodymium-doped glass. Rod 10 is mounted in a sphere 11 with the rod supported by and extending through the walls of the sphere 11 at openings 12 and 13. The rod 10 is of dimensions of the order of 1 millimeter square in section and 12 millimeters in length. The sphere 11 is hollow and about 10 millimeters in inside diameter.

The ends of the rod 10 are polished flat and parallel. The ends of the rod 10 have a multiple dielectric coating so that they are about 98% reflecting.

Mounted near the surface of the sphere and facing an opening 14 is a lens 15 which forms a part of a condenser system. The condenser system also includes lenses 16 and 17 interposed in suitable relationship one to the other between the sphere 11 and a light source 20. Light source 20 is positioned in front of a large ellipsoidal mirror 21 having a focal length $f$ and an effective opening figure of $f/0.4$. This system forms an image of the lamp 20 at the entrance pupil 17 of the condenser. The condenser, in turn, produces an image of mirror 21 in the opening 14. High intensity light flux is thus injected into the sphere 11. Light then is reflected from all internal walls in the sphere 11, some of which impinge upon and are absorbed by the rod 10 to excite the atoms therein.

During traverse of the multiple reflection paths inside the sphere, the light eventually will pass through the rod 10. By maintaining the openings 12 and 13 of minimum area as well as the opening 14, the loss of light from the sphere will be minimized. Energy therein will then be used to excite the rod 10 and thus energy can be extracted by emission from one or both ends of the rod 10 as may be desired. Other losses of energy will be by heating of the sphere and of the rod.

FIGURE 2 illustrates a sectional view of the mirror 21. In one embodiment the mirror was about 24 inches in diameter and 5 inches thick. The distance from the center of the mirror to the lamp 20 was 12.751 inches. The semimajor axis dimension was 25.503 inches and the semiminor axis dimension was 22.086 inches. The pupil 17 was spaced 38.254 inches from the apex of the mirror 21. By this means a very high light flux was injected into the sphere. This flux then caused stimulated emission in rod 10.

FIGURE 3 is illustrative of the increase in efficiency in a laser by the use of a reflecting enclosure for the laser rod 10 with minimal apertures therein. If the incident flux $\phi_0$ represents the amount of light injected into the enclosure through the opening 14, the total flux $\phi$ in the enclosure may be expressed as follows:

$$\phi = \phi_0 + R\phi_0 + R^2\phi_0 \ldots R^n\phi_0 \qquad (2)$$

where R is the total or diffused reflectivity.

Equation 2 may be expressed in the following form:

$$\phi = \phi_0 \times \frac{R}{1-R} \qquad (3)$$

It will be assumed for this example that reflectivity R is equal to .95; that the openings 12, 13 and 14 represent about 3% of the total surface area; and that the absorption of the rod 10 is 1%. In this case the effective reflectivity constant R is equal to 0.91. Thus, Equation 3 may be written:

$$\phi = \phi_0 \times \frac{.91}{.09} = 10\phi_0$$

By utilizing the enclosure 11 for the laser rod 10, which has highly reflective walls and minimum loss paths, the effective pumping light is increased by the factor of 10. The efficiency of this system depends upon the characteristics of the wall surface, the dimensions of the openings, and the volume of the sphere as compared to the volume of the rod.

The rod 10 preferably is neodymium-doped glass. In order for a neodymium-doped laser rod to be excited above the threshold level, it is necessary that energy be absorbed at least as high as about 30 watts per cubic centimeter. This is in contrast with ruby as a laser material which requires excitation of the order of 500 watts per cubic centimeter. Thus, the flux density in order to reach this maximum will depend upon the relative dimensions of the rod and the sphere. The light flux from the condenser is dispersed all over the volume of the sphere 11. In this case, the flux density in the rod will be proportional to the total flux $\phi$ divided by the volume $V'$ of the sphere. It is this flux density that will be effective in the rod itself. Thus, the higher the flux density within the sphere, the greater the energy usefully utilized in the rod 10. For this reason it is highly advantageous to retain within the sphere all the light possible from a given source.

In FIGURE 3, it will be noted that for a reflectivity $R=0.90$, the total flux is equal to 9 times the incident flux. The function then increases with reflectivity. If the effective reflectivity were 0.99, the increase in flux within the container would be 99. It will be appreciated that surfaces having reflectivity as high as 0.99 are difficult to produce. However, surfaces can be formed in the range illustrated in FIGURE 3 and the gain available by reason of the retention of light flux within a housing for a laser is readily apparent.

In one system employing the neodymium-doped laser rod an xenon lamp was employed. The lamp was of the type manufactured and sold by Osram of Berlin and Munich, Germany. The lamp is identified as Type XBO1600. It had a rated output of 1600 watts.

The laser system herein described designed for continuous operation employed the foregoing lamp and the condensing system as above described for introducing into the sphere 11 a high intensity pumping light flux at a useful pumping range of about 580 to 600 millimicrons. Light filters 18, FIGURE 1, may be employed to limit the pumping light to the efficient pumping band. In the case of neodymium-doped glass the most efficient light is in a fairly narrow band of from 560 to 610 millimicrons. The xenon lamp has an appreciable output over a fairly broad spectrum whereas neodymium has a number of absorption bands, the strongest being at 590 millimicrons. Thus, the use of an xenon lamp as a source is not the most efficient. However, in using such a source, filter 18 may be used to limit the band.

Filter 18 may be of a type known in the art as interference band filters and available commercially. Suitable filters are sold at Fish-Schurman Corporation, 70 Portman Road, New Rochelle, New York.

For continuous wave operation, light from source 20 was introduced into the sphere 11 above the level of that sufficient to cause lasing action in the rod 10. The laser beam may be modulated in accordance with the present invention. To this end, lasing action of rod 10 is controlled by a signal source or modulator unit 22. Unit 22 is connected by way of channel 23 to a Kerr cell 24 which serves to control the amount of light from source 25 which is injected into the sphere 11. A second condensing system 26 is employed for directing light from cell 24 into the sphere. The light from source 20 may be such that the laser rod 10 is excited either just below or at the threshold level. Signal-modulated light passing through the cell 24 may then excite the rod 10 into the lasing region. A relatively small amount of light can thus be employed for modulating the laser. The operation can be an "on-off" operation, as controlled by modulation from below to above the threshold level. Alternatively, the beam along axis 10a may be modulated by a continuously variable signal or other information containing signal. This may be accomplished by exciting the laser rod 10 to a level at least equal to the threshold level by light from source 20. Then, light modulated by control of the Kerr cell 24 will provide added excitation for laser action.

In a preferred embodiment the pumping light source is a sodium light whose output may be described as two sharp lines both lying within the strongest absorption band of neodymium. One line is at 588.9965 millimicrons and the other is at 589.5932 millimicrons. The yellow sodium lines occur at the maximum neodymium absorption and thus afford very effective pumping without the requirement of filters or loss of energy in bands other than that to which the rod is responsive.

Neodymium has emission at 1.06 microns. In order to absorb fluorescence emitted by a neodymium-doped laser rod, a selective absorbent such as a copper sulphate solution may be placed inside the sphere 11. Such solution does not absorb light at the pumping frequency range. Its presence is desirable to prevent light of the emission wavelength from stimulating the rod 10 in directions other than the direction of the laser beam.

Heat in the rod 10 and the sphere 11 can be dissipated by such well known means as use of a cooling bath or a coolant circulated through the sphere.

In the system of FIGURES 1 and 2 the laser rod was mounted in a sphere for confining and introducing light flux into the laser rod. In accordance with the modification illustrated in FIG. 4, a solid, transparent cylindrical body 30 has a laser rod 31 embedded in it. The body 30 is provided exteriorly with a coating or shell 35 having an opening 32 through which light passes into the cylinder from a light-condensing system 33. If, as is preferred, the rod is of doped glass the body 30 may be formed of the same glass undoped. The laser rod 31 is disposed within the solid cylinder 30 in an axially extending position and has its emission end aligned with and opposite an opening 34 provided in the coating 35. Other than the opening 34 and the opening 32, the outer coating 35 on the cylindrical body 30 is continuous. Thus, except for the absorption losses pumping light will be retained. Light in the cylinder 30 is reflected from the inner walls of the coating 35. The latter preferably is highly reflective so that substantially all of the light will be available for absorption by the rod 31.

In accordance with the modification of FIGURES 5 and 6, a cylindrical body 40 is surrounded by a reflecting coating 41. A laser rod 42 is mounted coaxially within the cylinder 40 and is aligned with an opening 43 to provide for laser output. Light is introduced into the system by the large opening on the end of the cylinder opposite the opening 43. In a preferred form, this embodiment of the invention includes a reflecting prism structure which is circular in form mounted at the open end of the cylinder. More particularly, the cylinder is provided with wall surfaces, such as the surface 45, which are oriented such that incident light will be reflected onto the cylinder walls for travel along reflection paths in the cylinder to the closed end where it is reflected. As light passes through the cylinder 40, the path segments pass through rod 42. By this means light is concentrated and maintained within the cylinder for a plurality of passes through the laser rod. As best seen in FIGURE 6, the rod 42 is mounted axially in the cylinder 40. Rod 42 may be neodymium-doped glass which is mounted in a matrix of glass without neodymium doping. In a further embodiment of the invention the rods 31 and 42 may be ruby and the cylinders in which they are mounted may be of sapphire.

FIGURES 7 and 8 illustrate a modification of the system of FIGURE 5. In this case the enclosure 40′ in which the laser rod 42′ is mounted is not cylindrical in shape. Rather, the walls are curved so that as the light flux decreases in intensity in travel from the mouth to the closed end of the structure by reason of absorption in the rod 42′, the number of passes through rod 42′ per unit length becomes greater. That is, the reflection angle becomes smaller. By this means the amount of light absorbed per unit volume at various points along the rod is substantially constant over the entire length of the rod.

In the embodiment of FIGURE 1 the laser rod is surrounded with a spherical jacket with highly reflecting walls. In the systems of FIGURES 4 and 5 the rod is surrounded by a concentric or cylindrical jacket of highly reflecting walls. In either case the jacket may be solid or may be hollow. Due to the many reflections of the pumping flux as it travels back and forth from the walls of the jacket, the laser rod is very effectively excited. In acordance with FIGURES 7 and 8, the jacket is so designed that excitation is uniform along the rod axis. It will be readily apparent that other excitation distributions may be achieved by proper shaping of the enclosing jacket.

Thus, in accordance with the foregoing description, a laser is provided which is characterized by the concentration and control of pumping light by means of a container for the rod preferably having minimal openings therein and highly reflecting walls. The walls are substantially continuous and highly reflective. The laser thus includes in one form light sources and condensing systems disposed between the source and an input opening to the housing for concentrating and directing light into the housing through an opening therein.

Features of the foregoing system relating to modulation and to sodium vapor excitation are described and claimed in copending application of Paul H. Keck filed concurrently herewith on February 16, 1962, Serial No. 174,374, and now abandoned.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a solid state laser the combination which comprises:
   (a) a laser rod having parallel end faces one of which is wholly light-reflective and the other of which is partially light-reflective,
   (b) an opaque shell surrounding said rod having wall surfaces facing said rod of high reflectivity with a first opening therethrough aligned with the partially reflective end of said rod and a second opening therethrough,
   (c) a light source,
   (d) a condensing system disposed between said light source and said second opening for concentrating and directing light flux into said shell through said second opening whereby said flux is retained in said shell for absorption by said rod, and
   (e) a dense transparent medium filling the space between the laser rod and shell.

2. In a solid state laser the combination which comprises:
   (a) a laser rod having parallel end faces one of which is wholly light-reflective and the other of which is partially light-reflective,
   (b) a solid transparent structure encasing said rod,
   (c) a reflective coating applied exteriorly to said solid structure having inner surfaces of high reflectivity, said coating having an aperture aligned with the axis of said rod and a second aperture therethrough,
   (d) a light source, and
   (e) a light condensing system disposed between said source and said second opening for concentrating and directing light flux into said structure through said second opening whereby said flux is retained within said structure for absorption by said rod.

3. The combination set forth in claim 1 in which the areas of said first and second openings are very small compared to the area of the wall surfaces of said structure.

4. The combination set forth in claim 1 in which said laser rod is a neodymium-doped laser rod, said light source is an xenon lamp and which is further characterized by a bandpass optical filter located in said light condensing system between said source and said second opening.

5. A solid state laser which comprises:
   (a) a laser rod having parallel end faces one of which is wholly light-reflective and the other of which is partially light-reflective,
   (b) a solid transparent cylinder encasing said rod and supporting said rod at the axis of said cylinder, said cylinder having a reflective coating on substantially the entire wall surfaces of high reflectivity inwardly characterized by having a first opening therethrough on the axis of said rod and a second opening therethrough,
(c) a light source, and
(d) a light condensing system disposed between said source and said second opening for concentrating and directing light flux into said second opening.

6. A solid state laser which comprises:
(a) a laster rod having parallel end faces one of which is wholly light-reflective and the other of which is partially light-reflective,
(b) a solid transparent cylinder encasing said rod and supporting said rod at the axis of said cylinder, said cylinder having a reflective coating on substantially the entire wall surfaces of high reflectivity inwardly characterized by having a first opening therethrough along with the axis of said rod and a second opening therethrough,
(c) a light source,
(d) a light condensing system disposed between said source and said second opening for concentrating and directing light flux into said second opening, and
(e) structure for directing light entering at said second opening along paths which intersect said axis.

7. A solid state laser according to claim 1 in which said dense transparent medium is a liquid.

References Cited by the Examiner
UNITED STATES PATENTS 2,913,665  11/1959  Bomke _____ 88—61
3,087,374  4/1963  Devlin et al. _____ 88—1

OTHER REFERENCES

Ciftan et al.: "A Ruby Laser with an Elliptic Configuration," Proceedings IRE, Volume 49, No. 5, May 1961, pages 960 and 961.

Missiles and Rockets, "New Solid-State Laser Described by Bell Labs.," Volume 10, No. 5, January 29, 1962, page 36.

Snitzer: "Optical Maser Action of $Nd^{+3}$ in a Barium Crown Glass," Physical Review Letters, Volume 7, No. 12, December 15, 1961, pages 444 to 446.

Stitch et al.: "Repetitive Hair-Trigger Mode of Optical Maser Operation," Proceedings IRE, Volume 49, No. 10, October 1961, pages 1571 and 1572.

Vienot: "Les Maser Optiques," Revue d'Optique, Volume 40, No. 1, January 1961, pages 4 to 22.

Vogel et al.: "Lasers: Devices and Systems, Part III," Electronics, Volume 34, No. 45, November 10, 1961, pages 81 to 85.

JEWELL H. PEDERSEN, *Primary Examiner.*